(12) United States Patent
Nelson et al.

(10) Patent No.: US 7,634,197 B2
(45) Date of Patent: Dec. 15, 2009

(54) COMPENSATION FOR TEMPERATURE AND VOLTAGE EFFECTS WHEN MONITORING PARAMETERS IN A TRANSCEIVER MODULE

(75) Inventors: Stephen Nelson, Cupertino, CA (US); Kishore Kamath, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 582 days.

(21) Appl. No.: 11/330,863

(22) Filed: Jan. 12, 2006

(65) Prior Publication Data

US 2006/0153570 A1 Jul. 13, 2006

Related U.S. Application Data

(60) Provisional application No. 60/643,285, filed on Jan. 12, 2005.

(51) Int. Cl.
*H01J 7/24* (2006.01)
*G01J 1/44* (2006.01)

(52) U.S. Cl. .......................... 398/135; 398/28; 372/33; 372/34; 372/38.02; 372/38.07

(58) Field of Classification Search ................. 398/25, 398/135; 372/33, 34, 38.02, 38.07
See application file for complete search history.

(56) References Cited

U.S. PATENT DOCUMENTS

| | | | | |
|---|---|---|---|---|
| 3,670,325 A | * | 6/1972 | Mathevosian | 341/13 |
| 3,736,851 A | * | 6/1973 | Ono et al. | 396/228 |
| 3,911,268 A | * | 10/1975 | Mori et al. | 250/206 |
| 4,124,825 A | * | 11/1978 | Webb et al. | 330/279 |
| 4,292,606 A | * | 9/1981 | Trimmel | 359/237 |
| 4,385,387 A | * | 5/1983 | Trimmel | 372/38.07 |
| 4,995,105 A | * | 2/1991 | Wechsler | 372/29.014 |
| 5,340,974 A | * | 8/1994 | Zalewski | 250/205 |
| 5,383,208 A | * | 1/1995 | Queniat et al. | 372/29.014 |
| 5,812,572 A | * | 9/1998 | King et al. | 372/38.04 |
| 5,953,690 A | * | 9/1999 | Lemon et al. | 702/191 |
| 6,044,095 A | * | 3/2000 | Asano et al. | 372/31 |
| 6,243,342 B1 | * | 6/2001 | Joo | 369/53.26 |
| 6,400,737 B1 | * | 6/2002 | Broutin et al. | 372/20 |
| 6,476,716 B1 | * | 11/2002 | Ledlow | 340/501 |
| 6,494,370 B1 | * | 12/2002 | Sanchez | 235/454 |
| 6,629,638 B1 | * | 10/2003 | Sanchez | 235/454 |
| 7,018,114 B2 | * | 3/2006 | Stewart | 385/92 |
| 7,024,059 B2 | * | 4/2006 | Kurchuk | 385/12 |
| 7,091,462 B2 | * | 8/2006 | Wilson et al. | 250/205 |
| 7,108,185 B2 | * | 9/2006 | McDonald | 235/462.01 |

(Continued)

*Primary Examiner*—Ken N Vanderpuye
*Assistant Examiner*—Danny W Leung
(74) *Attorney, Agent, or Firm*—Workman Nydegger

(57) ABSTRACT

A method for calibrating the calculation of a laser power measurement with respect to specified operational and/or environmental parameters in an optoelectronic device, such as an optical transceiver module having a laser diode, is disclosed. In particular, the method includes sensing analog data that relates to light emission from the laser diode using a monitor photodiode disposed in the optical transceiver module. Additional sensors are then used to sense analog data that relates to the temperature and voltage of the monitor photodiode. The analog data is converted into digital data, then a formulaic relationship that relates the light emission data to the temperature and voltage data is used to calculate the laser power of the laser diode. Calibration by this method accounts for unintended effects caused by temperature and voltage fluctuations in the optical transceiver module.

12 Claims, 4 Drawing Sheets

U.S. PATENT DOCUMENTS

| | | | |
|---|---|---|---|
| 7,166,826 B1* | 1/2007 | Kunst et al. | 250/205 |
| 7,230,961 B2* | 6/2007 | Hofmeister et al. | 372/29.015 |
| 7,326,921 B2* | 2/2008 | Matsumoto | 250/238 |
| 7,505,498 B2* | 3/2009 | Sanchez | 372/38.1 |
| 2002/0093999 A1* | 7/2002 | Tanaka | 372/38.01 |
| 2003/0152390 A1* | 8/2003 | Stewart et al. | 398/135 |
| 2004/0036007 A1* | 2/2004 | Wilson et al. | 250/205 |
| 2004/0188518 A1* | 9/2004 | McDonald | 235/382 |
| 2004/0257940 A1* | 12/2004 | Senga et al. | 369/47.26 |
| 2004/0262491 A1* | 12/2004 | Posamentier et al. | 250/205 |
| 2005/0132114 A1* | 6/2005 | Dybsetter et al. | 710/305 |
| 2006/0083275 A1* | 4/2006 | Stewart et al. | 372/34 |
| 2006/0118702 A1* | 6/2006 | Posamentier et al. | 250/214 R |
| 2006/0153570 A1* | 7/2006 | Nelson et al. | 398/135 |
| 2006/0285563 A1* | 12/2006 | Hakomori | 372/38.01 |
| 2007/0127530 A1* | 6/2007 | Pan et al. | 372/38.02 |
| 2008/0273561 A1* | 11/2008 | Fu et al. | 372/34 |

\* cited by examiner

COMPENSATION FOR TEMPERATURE AND VOLTAGE EFFECTS WHEN MONITORING PARAMETERS IN A TRANSCEIVER MODULE

CROSS-REFERENCE TO RELATED APPLICATIONS

This application claims the benefit of the U.S. Provisional Patent Application No. 60/643,285, filed Jan. 12, 2005, and entitled "Compensation for Temperature and Current Effects in Transceiver Module," which is incorporated herein by reference in its entirety.

BACKGROUND OF THE INVENTION

1. The Field of the Invention

The present invention relates generally to optoelectronic devices. More specifically, the present invention relates to optoelectronic devices that use microcode to account for temperature and current effects as well as other diagnostic parameters to determine the laser power for optoelectronic devices.

2. The Related Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from modest Local Area Networks ("LANs") to backbones that define a large portion of the infrastructure of the Internet.

Typically, data transmission in such networks is implemented by way of an optical transmitter (also referred to as an "optoelectronic transducer"), such as a laser or Light Emitting Diode ("LED"). The optoelectronic transducer emits light when current is passed through it, the intensity of the emitted light being a function of the magnitude of the current. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (referred to as a "laser driver" when used to drive a laser signal) configured to control the operation of the optical transmitter in response to various control inputs. The optical transceiver also generally includes an amplifier (referred to as a "post-amplifier") configured to amplify the channel-attenuated received signal prior to further processing. A controller circuit (hereinafter referred to as the "controller") controls the operation of the laser driver and post-amplifier.

Within an optical transceiver module, laser power, i.e., the amount of light emitted from the laser, is typically difficult to measure directly. Instead, laser power is often calculated indirectly by placing a photodiode near a laser and measuring the amount of residual light being transmitted from the laser. The photodiode produces a current that corresponds with the amount of light emitted, or laser power, from the laser.

During transceiver operation, various factors can affect the measurement of laser power as described above. For instance, variations in transceiver temperature can skew the measurement of residual light from the laser by the photodiode. In addition, voltage changes across the photodiode can alter laser power photodiode measurements.

Conventional systems and methods for measuring and calculating laser power have been unable to adequately compensate for temperature, voltage, and other factors that affect the accuracy of laser power and other monitored parameters. It would therefore be useful to provide a manner by which improved accuracy can be obtained in laser power and other parameter measurements in an optoelectronic device, such as an optical transceiver, and to compensate for factors that may affect such parameter measurements.

BRIEF SUMMARY OF THE INVENTION

The foregoing problems with the prior state of the art are overcome by the principles of the present invention, which relate to systems and methods for more accurately estimating the laser power of a laser for an optoelectronic device. The amount of laser power bears on the coupling efficiency into an optic fiber. It would thus be advantageous to be able to accurately determine the laser power which, in turn, assists a user in accurately determining the coupling efficiency of the optical signals. However, conventional methods for measuring laser power have been based on a single calibration of photodiode current and have not been able to capture the complex interrelationship of various environmental and/or operational parameters that can affect laser power or other monitored measurement.

In one embodiment, an optical transceiver includes a processor, a system memory, and persistent memory. The persistent memory includes microcode that can store a formulaic relationship between laser power and various parameters such as, but not limited to, temperature, voltage, laser bias current, and thermoelectric cooler ("TEC") current. The interrelationship between the various parameters in the formulaic relationship can be defined in the microcode so as to provide an accurate means by which laser power can be accurately determined. The formulaic relationship represented in the microcode can then be loaded into system memory from the persistent memory, then executed by the processor during operation of the optoelectronic device, together with the sensing by various sensors the data necessary to execute the formulaic relationship. The results of the execution yield an accurate measure of laser power, which measure can then be formatted and provided to a host.

Accordingly, the principles of the present invention provide for an efficient way to accurately provide a measure of laser power in an optical transceiver module, despite the fact that such a measurement is continually influenced by multiple operational parameters.

These and other features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

The present invention is directed to systems and methods for providing accurate calculations of monitored parameters relating to the operation of an optoelectronic device, such as an optical transceiver module ("optical transceiver" or "transceiver"). One monitored parameter of particular interest is laser power, or the amount of light emitted from a laser diode or other light source included in the transceiver. Laser power in one embodiment is calculated by accurately monitoring diagnostic data of the transceiver, then using the diagnostic data to calculate laser power according to a formulaic relationship that is stored and executed within the transceiver. Accurate calculations of laser power can help ensure, for instance, that sufficient coupling efficiency targets are achieved, or that proper eye safety is maintained by preventing operation of the laser when laser power exceeds permitted thresholds.

As used herein, the term "manufacturer" will refer to an entity that produces the optoelectronic device while the term "customer" refers to an entity that generally purchases an optoelectronic device for use in a fiber optic network. Both manufacturers and customers can be considered "users." It is usually the case that the customer will desire to receive a laser power measurement for the laser of an optoelectronic device, such as an optical transceiver. In this case, the laser power calculation can be made available to the user's host system with which the optical transceiver is connected. However, there may be some instances in which the manufacturer could also desire a laser power calculation for the laser. Generally, however, the present invention provides a way for laser power to be provided to a host system of the customer so that the host is able to modify optical transceiver operation as needed.

Figure 1:
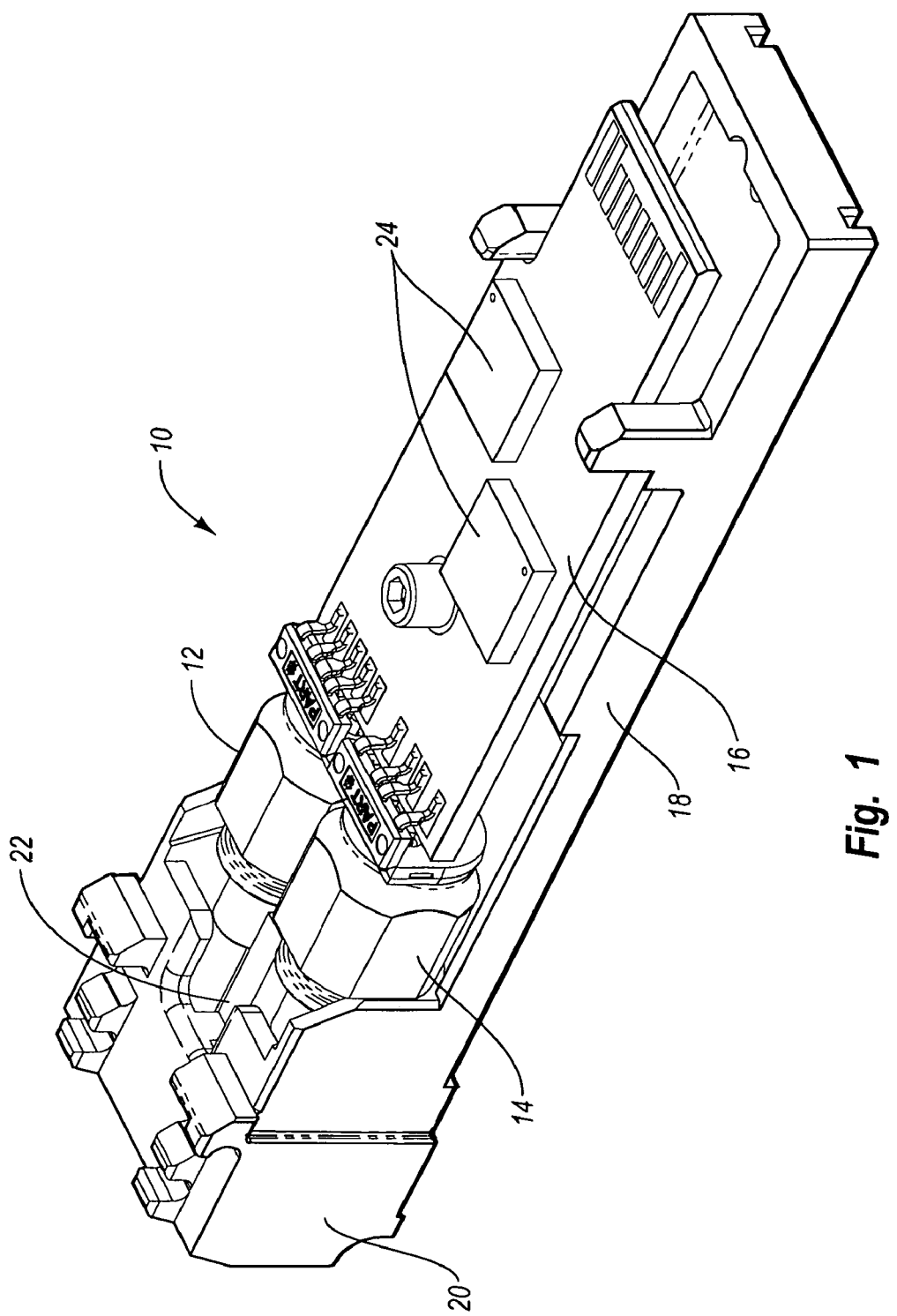
FIG. 1 is a perspective view of one embodiment of an optical transceiver according to one embodiment of the present invention.

The present invention can be implemented in various optoelectronic devices. As used herein, the term "optoelectronic device" includes devices having both optical and electrical components. Examples of optoelectronic devices include, but are not limited to, optical transceivers, transmitters, and/or receivers. FIG. 1 illustrates an exemplary optical transceiver 10 in which the principles of the present invention may be employed. The principles of the present invention allow for the optical transceiver 10 to perform end of life calculations autonomously and in real time. While the optical transceiver 10 will be described in some detail, the optical transceiver 10 is described by way of illustration only, and not by way of restricting the scope of the invention.

As depicted in FIG. 1, an exemplary transceiver module 10 includes a transmitter optical subassembly ("TOSA") 12, a receiver optical subassembly ("ROSA") 14, a printed circuit board (PCB) 16 and a housing 18 for containing the components of module 10. TOSA 12 and ROSA 14 are configured to be electrically and/or mechanically connected to PCB 16. In one embodiment, TOSA 12 and ROSA 14 are connected to PCB 16 using a lead frame connector disclosed in U.S. Pat. No. 10/809,992, filed Mar. 26, 2004, incorporated herein by reference. Of course other structures may be used to connect TOSA 12 and ROSA 14 to PCB 16 such as, but not limited to, flexible circuits, through-hole connections, and surface-mount connections. The transceiver 10 also includes a housing end 20, and LC cable receptacles 22 for receiving and securely connecting LC cables to TOSA 12 and ROSA 14.

The optoelectronic devices can be constructed, for example, to be compatible with the XFP MSA standards, including those set forth in the 10 Gigabit Small Form Factor Pluggable Module adoption draft specification Revision 2.0 published by the XFP Multi Source Agreement (MSA) Group on Dec. 16, 2002 (www.xfpmsa.org), which is incorporated herein by reference, and with future revisions or final XFP MSA specifications that will be adopted in the future. Furthermore, the principles of the present invention may be implemented in optoelectronic devices of any form factor such as XFP, SFP and SFF, without restriction. It will be appreciated, however, that the optoelectronic devices need not comply with standardized form factor requirements and may have any size or configuration necessary according to a particular design. The principles of the present invention are suitable for 1G, 2G, 4G, 8G, 10G and higher bandwidth fiber channels, both longwave and shortwave.

TOSA 18 includes a light source (not shown) having any suitable configuration including, but not be limited to, a distributed feedback ("DFB") laser, a VCSEL, a cooled or uncooled EML, an EML with a wavelocker, a Fabry-Perot laser, a laser emitting diode ("LED"), and the like. ROSA 20 may comprise, for example, a photodiode, an avalanche photodiode (APD), positive-intrinsic-negative photo diodes (PIN), and the like. In one embodiment, module 10 may include a temperature-compensated externally modulated laser (EML) for use in dense wavelength division multiplexing applications (DWDM) and therefore be more completely described as a DWDM EML XFP transceiver module.

As illustrated in FIG. 1, PCB 16 includes circuitry and electronic components 24 for use with the TOSA 12 and ROSA 14 in performing the optical signal transmission and reception activities of the transceiver 10. Among the components 24 are a laser driver, a post amplifier, a controller chip, and persistent memory. These components are described more fully below. It will be appreciated that one or more of these components can be integrated on a single chip, or can be separately disposed on the PCB 16. In one exemplary embodiment, the transceiver 10 uses the controller chip to drive laser power calculations for the transceiver internally within the module. In particular, the controller chip cooperates in one embodiment with the laser driver, post amplifier, and/or other components within the transceiver 10 to obtain diagnostic data and to perform laser power calculations for the laser, which can then be exported from the module, such as to a host system.

Figure 2:
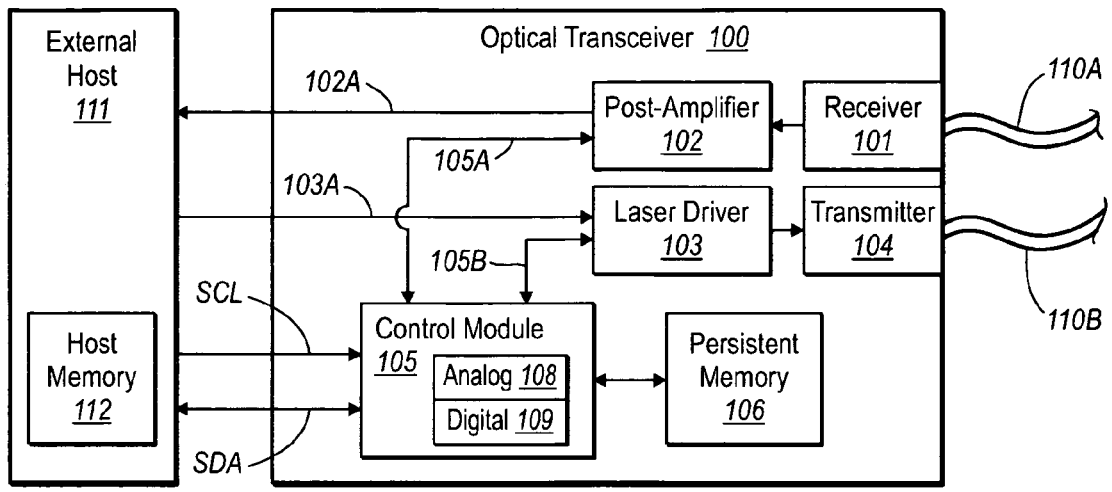
FIG. 2 schematically illustrates an exemplary optical transceiver that may implement features of the present invention.

With reference now to FIG. 2, the circuitry of an exemplary optoelectronic device, implemented here as a transceiver 100, is further illustrated, showing the interaction between the device 100, a host system such as an external host 111, and fiber optic cables 110A, 110B. Note that the transceiver 100 shown in FIG. 2 is a simplified block diagram of a transceiver such as that shown at 10 in FIG. 1.

In operation, the optical transceiver 100 receives an optical signal from fiber 110A using an optical receiver 101, which corresponds to the ROSA 14 of FIG. 1. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to the host 111 as represented by arrow 102A. The host 111 may be any computing system capable of communicating with the optical transceiver 100. The host 111 may contain a host memory 112 that may be a volatile or non-volatile memory source. In one embodiment, the optical transceiver 100 may be integrated with the host 111 in the form of a printed circuit board or other components/chips within the host 111, although this is not required. Additionally, some components of the optical transceiver 100 can reside on the host 111 while the other components of the transceiver reside on a printed circuit board separate from the host.

The optical transceiver 100 may also receive electrical signals from the host 111 for transmission onto the fiber 110B. Specifically, the laser driver 103 receives the electrical signal as represented by the arrow 103A, and drives an optical transmitter 104, which corresponds to the TOSA 12 of FIG. 1. As described, the transmitter 104 includes a suitable light source, such as a laser or light emitting diode ("LED") that is driven by the electrical signals provided by the host 111, thereby causing the light source to emit onto the fiber 110B optical signals representative of the information carried in the electrical signal. Accordingly, the optical transmitter 104 serves as an electro-optic transducer.

The behavior of the optical receiver 101, the post-amplifier 102, the laser driver 103, and the optical transmitter 104 may vary dynamically due to a number of factors. For example, temperature changes, power fluctuations, and feedback conditions may each affect the performance of these components. Accordingly, the transceiver 100 includes a control module 105, which may evaluate environmental conditions, such as temperature, and/or operating conditions, such as voltage, and receive information from the post-amplifier 102 (as represented by arrow 105A) and from the laser driver 103 (as represented by arrow 105B). This allows the control module 105 to optimize the dynamically varying performance, and additionally detect when there is a loss of signal. Specifically, the control module 105 may optimize the operation of the transceiver 100 by adjusting settings on the post-amplifier 102 and/or the laser driver 103 as represented by the arrows 105A and 105B. These settings adjustments can be intermittent and are generally only made when temperature or voltage or other low frequency changes so warrant. As discussed, the control module 105, the post-amplifier 102, and the laser driver 103 may be the same chip. Alternatively, they may be distributed across two or more chips.

The control module 105 may have access to a persistent memory 106, which in one embodiment, is an Electrically Erasable and Programmable Read Only Memory (EEPROM). Persistent memory 106 may also be any other non-volatile memory source. The persistent memory 106 and the control module 105 may be packaged together in the same package or in different packages without restriction.

Data and clock signals may be provided from the host 111 to the control module 105 using the serial clock line SCL, and the serial data line SDA. Also data may be provided from the control module 105 to the host 111 using serial data signal SDA to allow for transmitting diagnostic data such as environmental and/or operational parameters. The control module 105 includes both an analog portion 108 and a digital portion 109. Together, they allow the control module to implement logic digitally, while still largely interfacing with the rest of the optical transceiver 100 using analog signals.

The control module 105 senses and retrieves diagnostic data relating to the operation of the transceiver 100. As used herein, the term "diagnostic data" will refer to both environmental parameters and operational parameters, whether the parameter is provided as raw data or processed data. Diagnostic data can be provided in analog or digital form. The environmental parameters may be, for example, ambient transceiver temperature, supply voltage, humidity, acceleration, ambient light levels, ambient vibration, magnetic flux intensity, or any other environmental parameter that may affect the performance of an optoelectronic device and/or that may be compensated for by suitable adjustment of one or more operational parameters. Generally, environmental parameters are not directly controlled by the transceiver but nonetheless affect its operation. Operational parameters can include statistical information such as, for example, total operational time, average operational time between boots, total number of error conditions encountered, identification of one or more error conditions encountered, categorization of the number of error conditions encountered for a plurality of different error types, number of times the optical transceiver has been booted, or the like. Operational parameters also include, for example, laser wavelength, laser temperature, laser bias current, a Thermo Electric Cooler (TEC) current, laser transmit power ("laser power"), receive power, acceleration, peak acceleration, and the like. Generally, operational parameters are considered those parameters over which direct control can be had by the transceiver or host.

Figure 3:
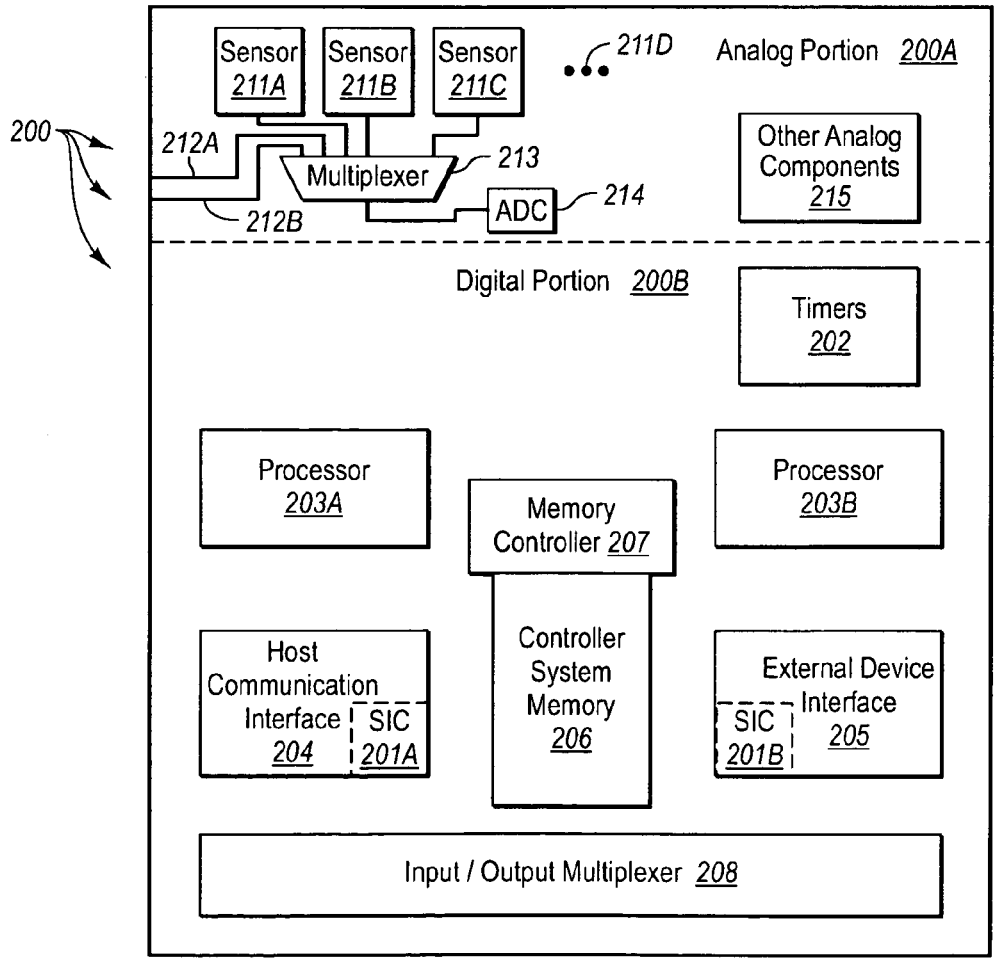
FIG. 3 schematically illustrates an example of a control module used in the transceiver of FIG. 2.

FIG. 3 schematically illustrates an exemplary configuration 200 of the control module 105 in further detail. The control module 200 includes an analog portion 200A that represents an example of the analog portion 108 of FIG. 2, and a digital portion 200B that represents an example of the digital portion 109 of FIG. 2. For example, the analog portion 200A may contain digital to analog converters, and analog to digital converters, high speed comparators (e.g., for event detection), voltage based reset generators, voltage regulators, voltage references, clock generator, and other analog components. For example, the analog portion includes sensors 211A, 211B, 211C amongst potentially others as represented by the horizontal ellipses 211D. Each of these sensors may be responsible for measuring diagnostic data including environmental and/or operational parameters that may be measured from the control module 200 such as, for example, supply voltage and transceiver temperature. The control module may also receive external analog or digital signals from other components within the optical transceiver. Two external lines 212A and 212B are illustrated for receiving such external analog signals although there may be many of such lines.

The internal sensors 211A through 211D may generate analog signals that represent the measured values. In addition, the externally provided signals 212A, 212B may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow for any order of analog signals to be sampled by ADC 214.

As previously mentioned, the analog portion 200A can include high speed comparators that may be supplied with one input being from an internal sensor or from an external line to receive a measured parameter value. The other input to the comparator may be a comparison value. Should the measured parameter value exceed the comparison value, the comparator may generate a logical high (or low) which indicates that the event has occurred. For example, suppose that the standard maximum transceiver temperature is 85 degrees Celsius. The actual measured transceiver temperature may be provided as one input to a comparator, while a value representing 85 degrees Celsius is provided to the other input of the comparator.

The digital portion 200B of the control module 200 may include a timer module 202 that provides various timing signals used by the digital portion 200B. Such timing signals may include, for example, programmable processor times. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111 using the serial data (SDA) and serial clock (line SCL) lines and the serial data line SDA of the optical transceiver 100. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. While system memory 206 may be RAM, it may also be a processor, register, flip-flop or other memory device. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or may be another serial interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input/output nodes within the control module 200 than there are pins available on the control module 200, thereby reducing the footprint of the control module 200.

In accordance with the present invention, the optical transceiver 100 performs a laser power calculation that can then be exported or made available to the customer at host 111. This may be accomplished in a number of ways using the environment described and illustrated with respect to FIGS. 2 and 3. It will be understood that this specific environment is only one of countless architectures in which the principles of the present invention may be employed. As previously stated, the principles of the present invention are not intended to be limited to any particular environment.

Figure 4:
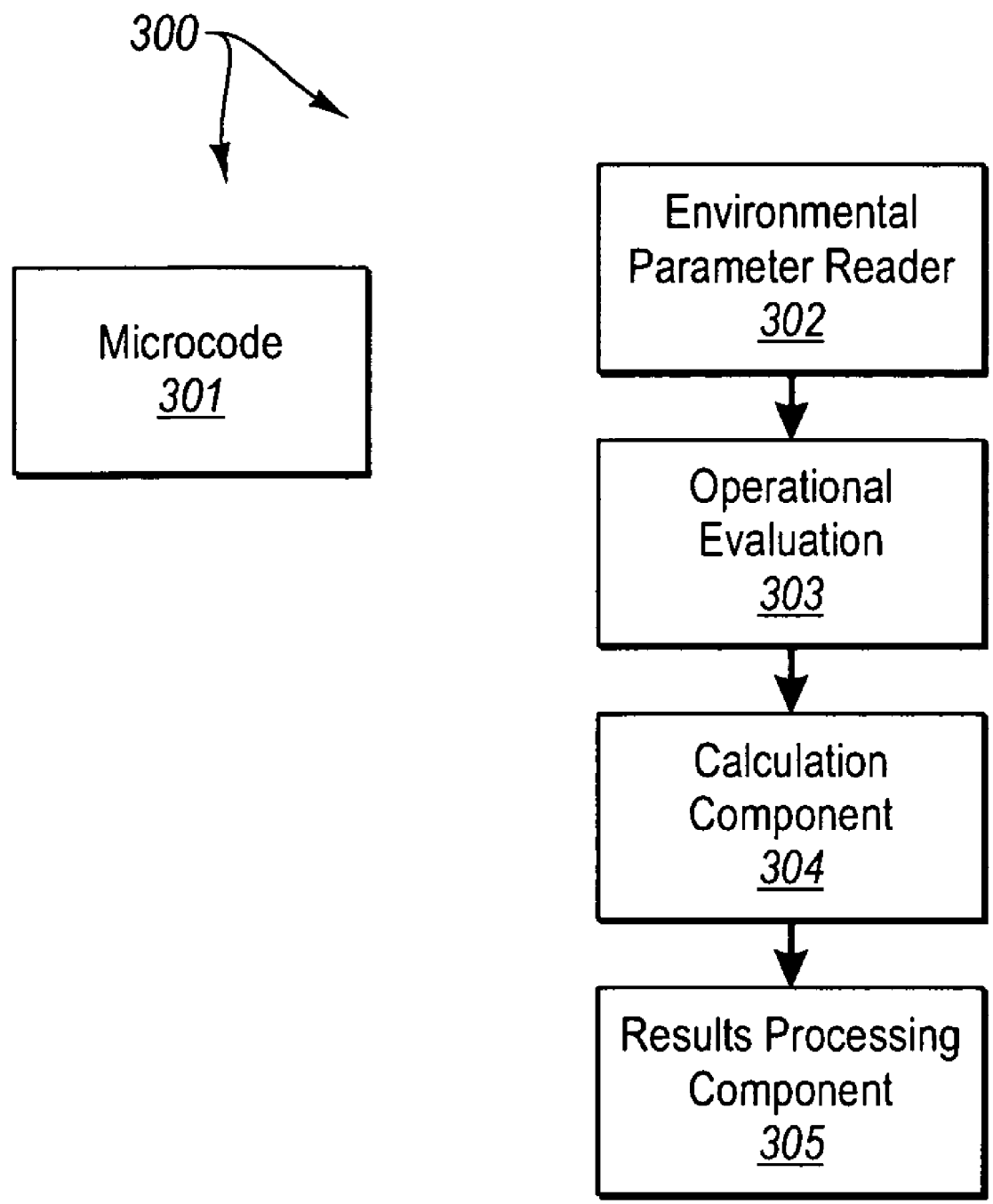
FIG. 4 illustrates an exemplary software architecture that may be maintained in system memory in accordance with embodiments of the present invention.

With continuing reference to FIGS. 2 and 3, reference is now made to FIG. 4, which illustrates a software architecture 300 that may be instantiated in system memory 206. In particular, the processors 203 load microcode 301 into the system memory 206 from the persistent memory 106. The remainder of the software architecture 300 is either instantiated in system memory 206 upon the execution of the microcode 301, or else abstractly represents functionality implemented by the optical transceiver 100 upon the execution of the microcode 301. Alternatively, the microcode 301 may be directly executed from persistent memory. In that case, the microcode 301 is loaded into the system memory a fraction at a time (e.g., one instruction at a-time) for execution by the processor. In this latter case, the system memory may be a register, flip-flops, or any other memory regardless of size or type. In yet another embodiment, the functionality to be described below can be achieved not through microcode loaded from persistent memory, but via an application-specific integrated circuit ("ASIC").

The software architecture 300 includes, in one embodiment, an environmental parameter reader component 302, an operation evaluation component 303, a calculation component 304, and a results processing component 305. The software architecture 300 of FIG. 4 will be described with reference to FIG. 5, which illustrates a flowchart of an exemplary method 400 for the optical transceiver to calculate laser power for a transceiver. Note that, while the discussion to follow is focused on compensating for various parameter-based effects when calculating laser power for a transceiver, embodiments of the present invention can be employed to compensate for other parameters that may be monitored, and in devices other than transceivers, as may be appreciated by one skilled in the art.

In general, the optical transceiver 100 first loads the microcode 301 from persistent memory 106 to system memory 206 (stage 401). One or more of the processors 203 then execute the microcode (stage 402). The microcode 301 is structured such that the optical transceiver 100 performs the acts illustrated at stage 402 when executed. Specifically, the processors 203 sense current diagnostic data for the optoelectronic device (stage 403), the diagnostic data is converted as needed to digital form (stage 404), a laser power calculation for the laser is performed (stage 405), and the results of the calculation can be formatted and/or exported to, for example, the host 111 (stage 406).

In further detail, at stage 401, the microcode for performing a laser power calculation is loaded. Exemplarily, one or more of the processors 203 load microcode stored in persistent memory 106 into controller system memory 206. If the persistent memory 106 is an I²C EEPROM, then this may be accomplished using the conventional I²C two-wire interface. However, for other persistent memories, other communication protocols may be used. The microcode from persistent memory 106 includes functions that direct the laser power calculation.

Alternatively, the microcode may be provided by the external host 111, delivered to control module 105 over serial data line SDA. For example, external host memory 112 may contain a library of different microcode functions. A user is thus able to interface with host 111 and select the microcode relating to the laser power calculation. In addition, external host 111 may be connected to the Internet or some other wide area network, allowing processors 203 to acquire microcode from a remote source. This connection can be achieved by any standard Internet or wide area network protocol. It will be appreciated that additional microcode may exist or be provided from a source to the control module 105 for performing functions that are related, unrelated, or preparatory to performing a laser power calculation. Thus, the laser power calculation can be initiated by the manufacturer or customer in several ways.

In one example embodiment, a formulaic relationship is employed to internally calibrate and accurately calculate the power of a laser or other light source during operation of the transceiver. This formulaic relationship takes into account various parameters that were previously not considered in making the laser power calculation. For instance, known methods for determining laser power ("LP") have involved the use of a monitor photodiode ("MPD"), positioned near the laser, which produces an analog current proportionate to the amount of light emitted by the laser. These known methods calculated the laser power using the following equation:

$$LP = A + B(MPD), \qquad (1)$$

where A is an offset value used to calibrate MPD analog measurements against signal noise, and B is a slope factor used both to convert the MPD units of amperes to the LP units of watts and to eliminate discrepancies when the analog MPD measurement is digitally converted by an analog-to-digital converter, such as the ADC 214 of the control module 200 shown in FIG. 3. Factors A (offset) and B (slope) are typically determined and set at the time of manufacture.

In accordance with the present embodiment, a method is employed whereby the laser power measurement is calibrated according to several additional elements so as to permit an accurate laser power calculation to be made. This improved calibration and calculation method can be determined by reference to the following general equation:

$$LP = A + B(MPD) + X_1(Y_1) + X_2(Y_2) + \ldots + X_n(Y_n), \quad (2)$$

where $X_n$ represents a slope factor for a corresponding additional compensation element $Y_n$. As shown by eq. (2), multiple additional elements Y can be added to the traditional laser power calculation shown in eq. (1), each with a corresponding slope factor X. These additional elements compensate for measurement discrepancies that may arise during measurements made for calculating laser power, or some other parameter desired to be monitored. This process is also known as "calibration."

For instance, temperature and voltage effects are known to affect the accuracy of measurements made by the MPD when determining laser power. Increases or decreases in temperature between MPD measurements of laser power can create different readings even when laser power has not in fact changed. Similarly, voltage changes across the MPD can cause alteration of an otherwise accurate MPD laser power measurement. Thus, in one exemplary embodiment, the format generally set forth in eq. 2 is employed to compensate for, i.e., to self-calibrate for, these temperature and voltage effects on MPD measurement, thereby canceling out their effects on the MPD measurement. As such, the calibrated laser power calculation performed by the transceiver in accordance with the exemplary embodiment can be expressed as follows:

$$LP = A + B(MPD) + C(T) + D(V), \quad (3)$$

where C is the slope factor for the temperature compensation element T, and D is the slope factor for the voltage compensation element V.

Utilization of eq. (3) of the present embodiment provides a means by which a calibrated measurement of laser power can be achieved internally by the transceiver or other optoelectronic device employing microcode or other suitable configuration providing the same functionality. That is, calibration by way of eq. (3) can enable the relationship between MPD measurement and temperature/voltage effects to be compensated for. For example, it may be known that, for every millivolt increase in voltage across the MPD during use, MPD measurement will vary by some amount, such as 1 microampere. Likewise, for every degree increase in temperature of the MPD during use, its measurement will also vary by some amount. Use of eq. (3) while calculating laser power will take these relationships into account and compensate for them, effectively eliminating the temperature and voltage skewing from MPD measurement, thereby providing for an accurate MPD measurement and laser power calculation to be made.

The causal relationship between temperature, voltage, and MPD measurement can be determined at time of manufacture. In detail, the slope factor C of eq. (3) represents the causal relationship between temperature T and MPD measurement, while slope factor D represents the causal relationship between voltage V and MPD measurement. Thus, in the case of temperature, for instance, the MPD at time of manufacture can be placed at a first temperature and record an external measurement of the laser power with a calibrated optical power meter, keeping the laser power constant. The MPD can then be raised to a second temperature, and another external measurement of the constant laser power with the calibrated optical power meter is made. Comparison of the two MPD measurement data points will determine what if any effect temperature has on MPD measurement. If an effect is detected, it will be represented by the slope factor C and will be encoded into eq. (3) to compensate for that effect. As mentioned, eq. (3) and its various factors are stored in one embodiment in the persistent memory 106 of the transceiver 100, or other suitable location.

Similarly for voltage, the MPD at time of manufacture a first voltage can be placed across the MPD, and an external measurement of constant laser power with a calibrated optical power meter is recorded by the MPD. A second voltage can then be placed across the MPD, and another external measurement of the constant laser power with a calibrated optical power meter is made. Comparison of the two MPD measurement data points will determine what if any effect voltage has on MPD measurement. If an effect is detected, it will be represented by the slope factor D and will be encoded into eq. (3) to compensate for that effect.

The above process can be repeated to acquire more data points, if desired, to further refine the causal relationship between temperature/voltage and MPD measurement variance.

As the general eq. (2) suggests, elements in addition to, or instead of, temperature and voltage can be employed to compensate for other factors that may affect measurement of the desired parameter. One example of an additional factor that could be considered is current drawn by a thermoelectric cooler mounted proximate the laser to regulate laser temperature during transceiver operation. However, it is noted that voltage and temperature factors are commonly desired to be compensated for, as these factors commonly affect sensors that detect a wide variety of operational and environmental parameters.

Also, these principles can be applied to the measurement of other parameters instead of laser power. Compensation for temperature and voltage effects in a receive power measurement of a photodiode of an optical receiver, such as the ROSA 14 shown in FIG. 2 is one example of an alternative use of the present method. Another example includes compensation for measurement variances caused by voltage affects across a temperature probe placed in the transceiver to monitor internal temperatures. These and other alternative implementations are therefore considered part of the present invention.

Note that eqs. (2) and (3) are linear equations. However, it is possible in one embodiment that these equations could include non-linear or complex elements, such as logarithmic or exponential factors. Thus, the present form of eqs. (2) and (3) should not be considered limiting of the present invention in any way. As described above, the laser power calculation of a laser is based on a number of different parameters which can be measured and obtained by control module 105. At stage 403, the microcode can drive retrieval of diagnostic data measurements relating to operational and environmental parameters. The environmental parameter reader component 302 (FIG. 4) can be employed to sense environmental parameters, while operational parameters of the transceiver 100 are obtained using the operation evaluation component 303 (FIG. 4). For instance, the operation evaluation component 303 can utilize the MPD (not shown) to sense a predetermined parameter, in this case laser power, while the environmental parameter reader component 302 can utilize sensors, such as the sensors 211 in FIG. 3, to sense additional parameters, such as MPD temperature and MPD voltage. The calculation component 304 then performs the laser power calculation using the sensed environmental and/or operational parameters as provided by the environmental parameter reader component 302 or operation evaluation component 303, and the results processing component 305 prepares the completed calculations for use by the host. These latter actions will be discussed further below.

Figure 5:
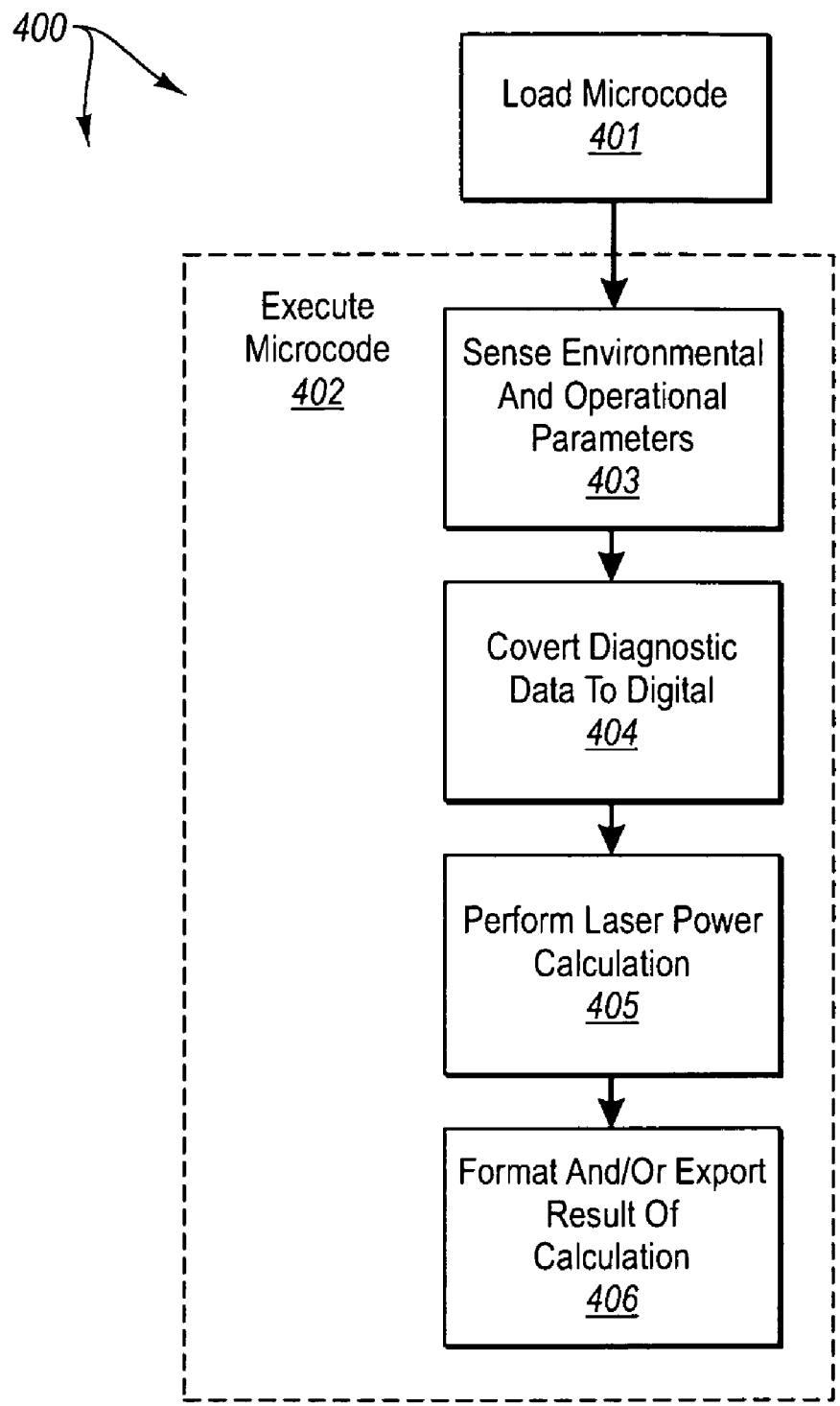
FIG. 5 illustrates a method for performing a laser power calculation in accordance with one embodiment of the present invention.

At stage 404 of FIG. 5, the laser power calculation can be facilitated by analog portion 200A and digital portion 200B cooperating to convert the sensed analog parameter data to a digital format. In particular, one or more analog-to-digital converters, such as the ADC 214, can be employed to accomplish this task. As discussed above, analog measurements can be converted after sensing to digital measurements to facilitate compatibility with a digital circuit. Thus, calculation of laser power can be achieved using digital logic, increasing the speed and accuracy of the calculation. In addition, because the sensed data in digital format can be provided in true units within control module 200, no conversion factors are required, which further increases the accuracy and speed of the laser power calculation. After conversion, the digital data can be forwarded from the analog portion 200A of the control module 200 to the digital portion 200B, if needed.

At step 405, the control module 105 drives the laser power calculation using a version of eqs. (2) or (3), discussed above, which results in a compensated, accurate calculation of laser power. At stage 406, the resulting laser power calculation can be available to the host 111, user, or other entity that desires to receive the data. The laser power calculation can be made available to the user and/or host 111 in various ways. As described above, the results can be exported directly to the host 111 via the SDA and SCL lines (FIG. 2). In another embodiment, however, the results can be simply maintained in the system memory 206 of the control module 200 for accessing by the host. In yet another embodiment, the results can be maintained in the persistent memory 106 of the transceiver 100 for forwarding or accessing at a later time. These and other manners of storing and/or accessing the calculation results are therefore understood to fall within the principles of the present invention.

An exemplary laser power calculation in accordance with one embodiment can proceed as follows: during transceiver operation, the microcode for executing laser power measurement can be loaded (stage 401) into the system memory 206 and executed by one or more of the processors 203 (stage 402) as generally described above. Analog measurements made by the appropriate sensors located in the transceiver 100 can be forwarded from the sensors located in the transceiver 100 to the analog portion 200A of the control module 200 (stage 403). In the present example, a predetermined operational parameter of laser power by an MPD, and additional environmental parameters of MPD temperature and MPD voltage, are sensed and forwarded.

As already explained, the analog parameter measurements are converted into digital data by one or more ADCs 214 of the control module analog portion 200A, or by another suitable component. (stage 404).

Stage 405 is then executed, wherein a calculation of laser power is made. In accordance with the above discussion, the digitally converted parameter measurements are input into system memory 206. Using the parameter measurements present in the system memory 206, one or both processors 203 calculate the laser power according to loaded microcode configured to make this calculation. In the present embodiment, the microcode is configured to execute and solve for eq. (3), wherein the laser power measurement is compensated for by temperature and voltage conditions present at the MPD during time of measurement. As already discussed, in one embodiment the offset A and slope factors B, C, and D are previously determined at time of manufacture. The digitally converted parameters measurements for laser power ("MPD" in eq. (3)), MPD temperature ("T" in eq. (3)), and MPD voltage ("V" in eq. (3)) are plugged into the equation together with the predetermined offset and slope factors, resulting in a solution, which represents a laser power measurement calibrated for temperature and voltage-related effects. Once calculated, the laser power can be stored or provided to the host as discussed above. The host may then take action to alter the laser power, if needed.

Note that, as part of the microcode execution, the temperature, voltage, or other additional parameters that are employed in the laser power calculation can themselves be further calibrated in order to account for measurement variances caused by certain parameters. For instance, the accuracy of measurement of the MPD temperature described above could itself be affected by voltage changes across the temperature sensor. As such, additional compensating calculations could be made to the temperature parameter measurement before its use in eq. (3), for example.

As has been discussed above, systems and methods are provided for a more robust and accurate calculation of the laser power of a laser for an optoelectronic device. That is, the laser power calculation is able to take into account more environmental and operating parameters that affect the laser power of an optoelectronic device than conventional methods.

Note that converting the measurements of operational and environmental parameters to digital form desirably allows the control module 200 to use digital logic to perform the above-described laser power calculation in an even more accurate manner than what would otherwise be possible.

In another aspect of the invention, the laser power calculation can occur on a real time basis. In real time, the environmental parameters and operational parameters are constantly fluctuating. In addition, the user may be constantly trying to calibrate the optoelectronic device to operate within calibrated parameters. In one embodiment, the optoelectronic device is able to do internal self-calibration. This is described in more detail in U.S. patent application Ser. No. 10/882,447, filed Jun. 30, 2004, herein incorporated by reference. Using self-calibration, the optoelectronic device is constantly readjusting and correcting for affects in environmental parameters and operational parameters. As such, the diagnostic data of the optoelectronic device will be constantly fluctuating. Conventional laser power calculations do not adequately take into account this constant fluctuation in parameters to the extent necessary to provide an accurate laser power calculation. Because the optoelectronic device can obtain a real-time analysis of the diagnostic data, the laser power calculation can constantly be updated and revised.

The above-described process of calculating laser power may be repeated as needed or desired. For instance, the microcode may be structured so that this process is executed when the host requests a calculation to be made, or when the environmental parameter reader component 302 or operation evaluation component 303 detects a significant change in environmental or operational parameters that relate to the laser power of the laser. The result in the latter case is continuous and accurate laser power calculation for the laser.

In addition, this invention can be important for eye safety. If an operator believes that the laser is transmitting below the allowed power, but is actually operating above, it can be hazardous. In addition, if operator believes the laser is operating above the allowed level, but is actually operating below, the operator might prematurely cut off power to the laser. The present invention thus allows the laser to operate more accurately and with a greater degree of safety.

Finally, an additional aspect of the invention is that it provides for calculation of laser power where more than one laser is coupling into a single optical fiber. In this situation, the conventional method has been to base laser power on the MPD current created by a combination of the lasers. However, this assumes that each laser beam is contributing equally to the laser power when in reality, one of the lasers could be weaker than the others. With embodiments of the present invention, the laser power of each laser contributing to the combination of wavelengths entering the optical fiber can be accurately calculated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transceiver module, comprising:
an optical transmitter containing a laser diode;
a first sensor for sensing a predetermined parameter relating to operation of the laser diode, wherein the first sensor is a monitor photodiode, and wherein the predetermined parameter relates to laser power of the laser diode;
at least one additional sensor for sensing at least one additional parameter that affects measurement of the predetermined parameter; and
a processor capable of executing microcode, wherein the microcode, when executed, causes the optical transceiver to perform the following: by the first sensor, sensing data relating to the predetermined parameter;
by the at least one additional sensor, sensing data relating to the at least one additional parameter; and
according to a formulaic relationship relating the data of the predetermined parameter and the data of the at least one additional parameter, calculating a result relating to the predetermined parameter, wherein the formulaic relationship is configured to eliminate discrepancies relating to temperature and voltage fluctuations of the monitor photodiode.

2. The optical transceiver module as defined in claim 1, wherein the at least one additional parameter alters the calculation of the result relating to the predetermined parameter.

3. The optical transceiver module as defined in claim 1, wherein the formulaic relationship includes an offset and slope factor for the predetermined parameter, and a slope factor for the at least one additional parameter.

4. The optical transceiver module as defined in claim 1, wherein the at least one additional parameter includes a first parameter relating to temperature of the monitor photodiode and a second parameter relating to voltage of the monitor photodiode.

5. The optical transceiver module as defined in claim 1, wherein the formulaic relationship includes a linear equation.

6. In an optical transceiver module having an optical transmitter that includes a laser diode, a method for calculating the laser power of the laser diode, the method comprising:
by a monitor photodiode, sensing analog data relating to light emission from the laser diode;
by additional sensors, sensing analog data relating to the temperature and voltage of the monitor photodiode;
converting the analog data into digital data; and
by a formulaic relationship relating the light emission data to the temperature and voltage data, calculating the laser power of the laser diode, wherein the formulaic relationship is configured to eliminate discrepancies relating to temperature and voltage fluctuations of the monitor photodiode.

7. The method for calculating as defined in claim 6, wherein the method is at least partially performed by a processor executing microcode.

8. The method for calculating as defined in claim 7, further comprising: loading microcode from a persistent memory location into a system memory location.

9. The method for calculating as defined in claim 6, further comprising, reporting the calculated laser power to a host system.

10. The method for calculating as defined in claim 9, wherein the method is repeated periodically or when requested by the host system.

11. The method for calculating as defined in claim 10, wherein the temperature and voltage data in the formulaic relationship alters the calculated laser power result.

12. In an optical transceiver module having an optical transmitter that includes a laser diode, a method for calculating the laser power of the laser diode, the method comprising:
loading microcode from a persistent memory location into a system memory location;
by a monitor photodiode, sensing analog data relating to light emission from the laser diode;
by additional sensors, sensing analog data relating to the temperature and voltage of the monitor photodiode;
converting the analog data into digital data; and
by a formulaic relationship relating the light emission data to the temperature and voltage data, calculating the laser power of the laser diode, wherein the formulaic relationship is configured to eliminate discrepancies relating to temperature and voltage fluctuations of the monitor photodiode, wherein the method is at least partially performed by a processor executing the microcode.

* * * * *

UNITED STATES PATENT AND TRADEMARK OFFICE
CERTIFICATE OF CORRECTION

PATENT NO. : 7,634,197 B2 Page 1 of 1
APPLICATION NO. : 11/330863
DATED : December 15, 2009
INVENTOR(S) : Nelson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 919 days.

Signed and Sealed this

Ninth Day of November, 2010

David J. Kappos
*Director of the United States Patent and Trademark Office*